United States Patent
Beusse et al.

(10) Patent No.: US 6,709,043 B2
(45) Date of Patent: Mar. 23, 2004

(54) COVER FOR GOLF CART

(75) Inventors: James H. Beusse, Longwood, FL (US); Albert James Light, Winter Springs, FL (US)

(73) Assignee: Pro Line Sports, Inc., Lake Mary, FL (US)

( * ) Notice: Subject to any disclaimer, the term of this patent is extended or adjusted under 35 U.S.C. 154(b) by 0 days.

(21) Appl. No.: 10/391,374

(22) Filed: Mar. 18, 2003

(65) Prior Publication Data

US 2004/0021340 A1 Feb. 5, 2004

Related U.S. Application Data

(60) Provisional application No. 60/400,448, filed on Aug. 1, 2002.

(51) Int. Cl.[7] .................................................. B60P 7/02
(52) U.S. Cl. ............................ 296/100.16; 296/100.15; 280/DIG. 5
(58) Field of Search ............................ 296/77.1, 79, 80, 296/83, 138, 140, 141, 143, 147, 100.15, 100.16; 280/DIG. 5; 160/370.22; 150/159, 166

(56) References Cited

U.S. PATENT DOCUMENTS

| | | | | |
|---|---|---|---|---|
| 5,722,594 A | * | 3/1998 | Farr et al. ............... | 280/DIG. 3 |
| 5,741,041 A | * | 4/1998 | Sullivan ................ | 296/100.16 |
| 5,758,513 A | * | 6/1998 | Smith ..................... | 62/457.5 |
| 6,007,134 A | * | 12/1999 | Weston .................. | 280/DIG. 5 |
| 6,068,325 A | * | 5/2000 | Hughes ................. | 296/100.16 |
| 6,227,217 B1 | * | 5/2001 | Peta ......................... | 296/77.1 |
| 6,601,745 B2 | * | 8/2003 | Tyrer ......................... | 224/274 |
| 2002/0096908 A1 | * | 7/2002 | Tyrer et al. ................. | 296/136 |

* cited by examiner

*Primary Examiner*—D. Glenn Dayoan
*Assistant Examiner*—Lori L Coletta
(74) *Attorney, Agent, or Firm*—James H. Beusse; Beusse Brownlee Wolter Mora & Maire, P.A.

(57) ABSTRACT

An apparatus that may be removably attached to a golf cart for covering a bag storage area of the golf cart may include a top panel sized to cover the bag storage area, fasteners for releasably coupling the top panel to the golf cart, a first side panel and a second side panel each having a respective upper edge wherein a first segment of each respective upper edge is connected to a corresponding respective edge of the top panel, fasteners for releasably coupling the first side panel and the second side panel to the golf cart, a back panel having a rear upper edge and a pair of lateral edges, the back panel positioned between the first side panel and the second side panel wherein the back panel is connected along a portion of each lateral edge to a respective portion of the first side panel and the second side panel and wherein a portion of the rear upper edge is connected to the top panel, and fasteners for releasably coupling the top panel to at least one of the first side panel and the second side panel and the back panel such that a portion of the top panel may be lifted to define an opening for accessing the bag storage area of the golf cart.

19 Claims, 3 Drawing Sheets

COVER FOR GOLF CART

SPECIFIC DATA RELATED TO THE INVENTION

This application claims the benefit of a U.S. provisional application filed on Aug. 1, 2002 having application No. 60/400,448 titled CLUB CANOPY, which is specifically incorporated herein by reference.

BACKGROUND OF THE INVENTION

This invention relates in general to water resistant enclosures and in particular to a water and mildew resistant cover for overlaying the golf club compartment of a golf cart to protect the golf bags, clubs and grips from inclement weather conditions such as rain while allowing players easy access to their respective clubs during play.

Playing golf is a challenging endeavor for many amateur players. One factor that can make the game even more challenging is playing in inclement weather conditions, especially rain, because the grips on a golf club and when wet make it more difficult to grip the club when making a shot. Another disadvantage of playing in the rain is that a player's golf bag and clubs may get drenched during the round. If the clubs and bag aren't properly dried and taken care of after that round then mold or mildew may form in the bag and the steel shafts and heads of the clubs may become rusty. Protecting them from rain can eliminate or reduce the amount of time a player must spend after a round taking care of their equipment.

Many private golf clubs provide its members and guests with golf carts that include heavy duty covers attached to the golf carts for protecting the players' golf clubs, grips and bags. However, for the more typical amateur playing public or semi-private golf courses such protective covers are not always provided by the course. In such cases, it would be advantageous to provide a lightweight, water repellent cover that any player could carry in their bag and quickly attach to a golf cart in the event of rain, for example, to protect their equipment. It would also be advantageous to provide the cover in a convenient carrying pouch so that the player can quickly remove it from the pouch for attaching to a golf cart, fold the cover after use, insert it into the pouch and place it back in his bag.

BRIEF SUMMARY OF THE INVENTION

An apparatus that may be removably attached to a golf cart for covering a bag storage area of the golf cart to protect golf bags and clubs from inclement weather is provided that may include a top panel sized to cover the bag storage area and means for releasably coupling the top panel to the golf cart. The apparatus may include a first side panel and a second side panel each having a respective upper edge wherein a first segment of each respective upper edge is connected to a corresponding respective edge of the top panel so that the side panels hang downwardly when the top panel is coupled to the golf cart. Means for releasably coupling the first side panel and the second side panel to the golf cart may be provided. A back panel having a rear upper edge and a pair of lateral edges may be provided where the back panel is positioned between the first side panel and the second side panel. The back panel may be connected along a portion of each lateral edge to a respective portion of the first side panel and the second side panel and a portion of the rear upper edge may be connected to the top panel so that when the protective cover is attached to the golf cart it encases the bag storage area. Means for releasably coupling the top panel to at least one of the first and second side panels and/or the back panel may be provided so that a portion of the top panel may be lifted to define an opening for accessing the bag storage area of the golf cart. In one exemplary embodiment each rearward corner of the top panel may be lifted to define respective openings through which a set of respective golf clubs and/or golf bags may extend for easy access by a player. The respective corners may include a hook and loop strip, for example, a "VELCRO" strip, that releasably couples the top panel to respective mating strips on the side panels.

DETAILED DESCRIPTION OF THE INVENTION

Figure 1:
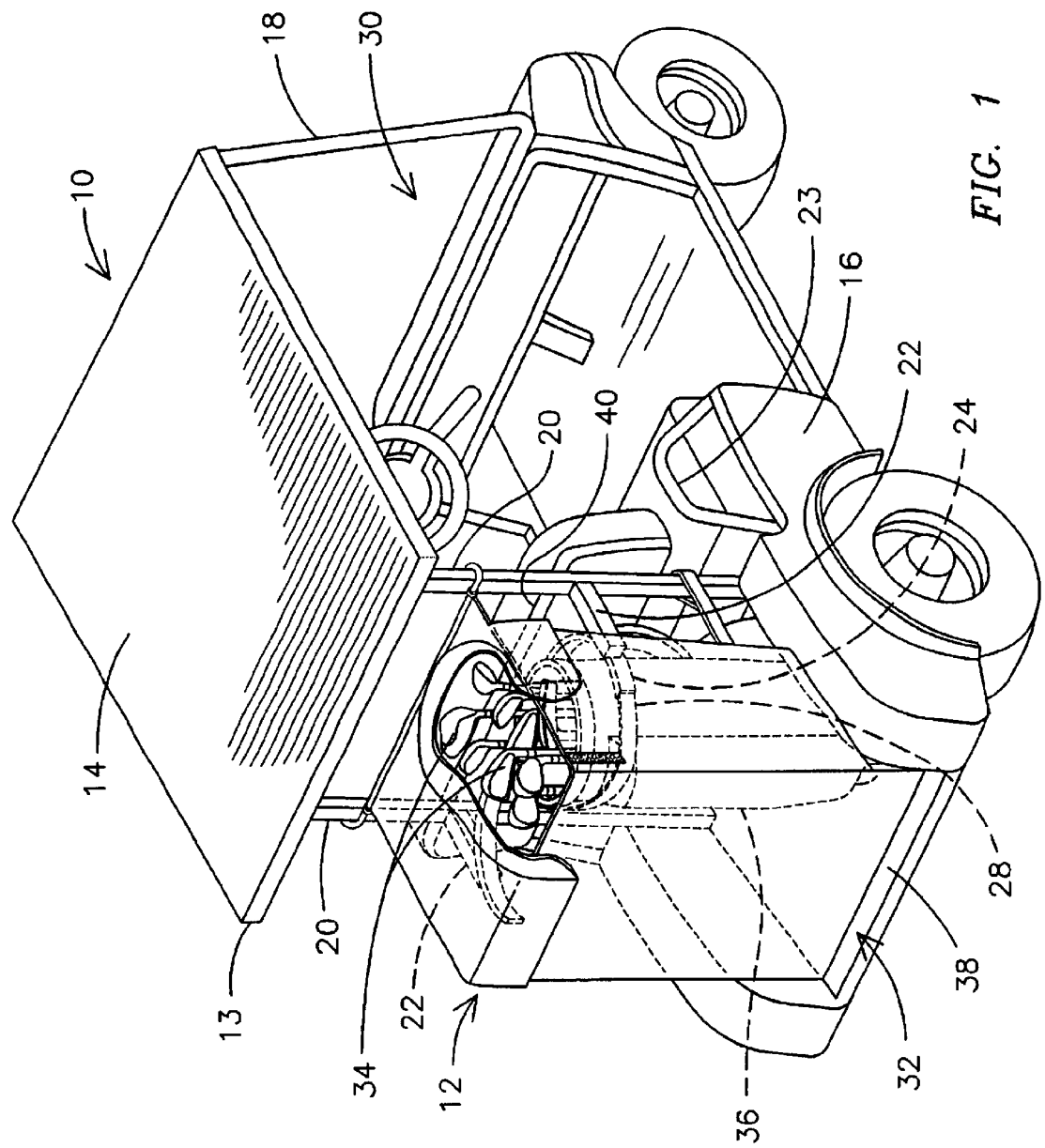
FIG. 1 illustrates a perspective view of a typical golf cart having an exemplary embodiment of the present invention attached thereto.

FIG. 1 illustrates a perspective view of a typical golf cart 10 having an exemplary embodiment of the present invention attached thereto, generally referred to as 12. Cart 10 may include a roof or top 14 that may be generally supported from the cart's body portion 16 by a front frame member 18 and a pair of rear support posts 20. Lateral support brackets 22 may extend in a rearward direction from the support posts 20 to which a bag rest bracket 24 may be attached. Handrails 23 may be positioned on each side of the cart 10. The bag rest bracket 24 is adapted for cradling golf bags 26 during play of a golf game. A pair of straps 28 may be provided to help secure the bags 26 in the bag rest bracket 24. Top 14 is primarily provided to protect occupants sitting in a passenger compartment 30 of cart 10 from inclement weather such as rain or ultraviolet rays. The rear area of cart 10 includes a bag storage area 32 within which one or two sets of golf clubs 34 may be transported in respective golf bags 36. The bottoms of a bag 36 may rest on a platform 38 when secured to the bag rest bracket 24 by a strap 28. Cart 10 may also include a basket (not shown) for stowing gear during play that is typically situated between a seat back cushion 40 and the bag rest bracket 24.

Figure 2:
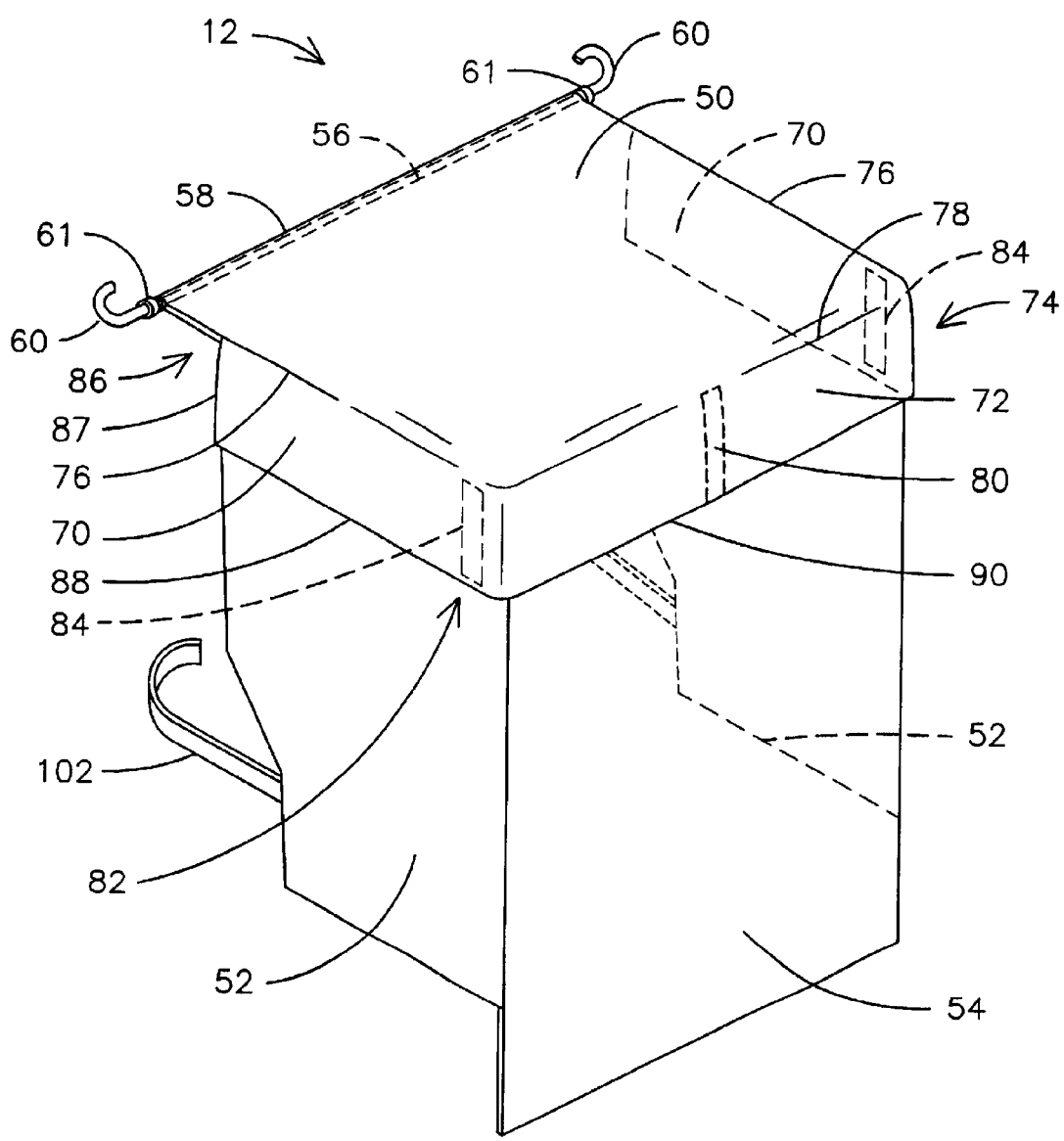
FIG. 2 illustrates a plan view of one embodiment of a back panel of the present invention.

FIG. 2 illustrates one exemplary embodiment of the protective cover 12 shown in FIG. 1 in a "closed" position or the position it would be in to protect or otherwise cover the golf clubs 34 and golf bags 36 stored in the bag storage area 32. The protective cover 12 may be constructed primarily or entirely of any suitable lightweight, mildew resistant, water repellant and/or resistant material such as a commercially available durable nylon. One embodiment of protective cover 12 may include a top panel 50, a pair of side panels 52 and a back panel 54. In one exemplary embodiment, the side panels 52 and back panel 54 may be formed as one piece and hang from the top panel 50 like a curtain. Other exemplary embodiments will be recognized by those skilled in the art such as shaping the cover 12 as an igloo or other appropriately sized conical section, for example. One aspect allows for an elastic cord 56 to be held within a channel formed within the material along the width of the front edge 58 of the top panel 50. The elastic cord 56 may be made of conventional material such as the commercially available material known as a Bungee Cord, for example. Alternate embodiments allow for various other materials to be used that may include a non-elastic cord, for example. Fastening means such as a hook 60 may be affixed to each end of the elastic cord 56 in a conventional manner such as by using loop connectors 61 with the cord end passing through a loop and being tied off. The hooks 60 may be used to connect the top panel 50 of the protective cover 12 to a golf cart 10 such as by securing the hooks 60 to a ridge (not shown) formed along the underside and rear edge of the golf cart's top 14. Hooks 60 may also be secured to other parts of the cart 10, such as the rear support posts 20 for example as shown in FIG. 1, that are suitable for maintaining the top panel 50 in a relatively stable position while the golf cart 10 is in use. Hooks 60 allow for securing the top panel 50 to various locations on the cart 10, which allows a golfer, for example, to ensure the front edge 58 is maintained underneath the rear edge of the cart top 14. This arrangement helps to prevent rain water from dripping off the top 14 onto the players' golf clubs 34 and/or golf bags 36.

One aspect allows for the length of the elastic cord 56 when at rest to be shorter than the width of the front edge 58 of the top panel 50. In this respect, the material defining the length of the channel formed in the front edge 58 encasing the cord will gathered together or "bunch up" slightly when the cord is at rest because the diameter of the hook connectors 61 is larger than the diameter of the channel formed in the front edge 58. In other words, the connectors 61 will urge the ends of the front edge 58 material towards each other as the elastic cord 56 returns to its resting position. Differing these dimensions is advantageous for securing the top panel 50 to a cart 10 while ensuring the front edge 58 spans as much width as possible. For example, most carts 10 have similar construction and dimensions, however, the elastic cord 56 may be used with golf carts, or other vehicles, having different locations for attaching the hooks 60. Some locations may be closer together relative to others. If the elastic cord 56 is attached to the cart 10 and the cord remains substantially at rest then the front edge 58 will span the entire length of the elastic cord 56. If the elastic cord 56 must be stretched to be attached to cart 10 then a golfer may un-gather or "un-bunch" the material so that it spans all or substantially all of the elastic cord's, 56 stretched length. One aspect allows for the width of the front edge 58 to be approximate that of the distance between the rear support posts 20. Alternate embodiments allow for this width to vary and it may be substantially wider than the distance between the posts 20 for use when the elastic cord 56 is stretched to its maximum length, which could be between two locations that define a distance much longer than that between the posts 20.

Returning to FIG. 2, one exemplary embodiment of the protective cover 12 allows for a pair of side panel flaps 70 and a rear panel flap 72 to extend around an upper perimeter 74 of the protective cover 12. One aspect allows for the side panel flaps 70 and the rear panel flap 72 to be connected with, or formed as part of, the top panel 50 along the entire upper edge 76 of the side panel flaps 70 and the entire upper edge 78 of the rear panel flap 72. In this respect, a seam or interface may be defined by the intersection of the upper edges 76 and 78 of the side and back panels 52 and 54, and the perimeter edges of the top panel 50 to allow the side and back panel flaps 70 and 72 to overhang the respective side and back panels 52 and 54. This ensures that rain water running off the top panel 50 when the protective cover 12 is closed will be directed over the outside surfaces of the side and back panels. One aspect allows for the back panel flap 72 to be affixed to the back panel 54 to define a pair of openings for accessing the bag storage area 34 as more fully described below. For example, the back panel flap 72 may be permanently sewn to the back panel 54 proximate the flap's 72 midpoint 80 by using conventional techniques such as sewing them together with a strip of nylon and reinforced stitching. Alternate aspects allow for the back panel flap 72 to be releasably coupled with the back panel 52 proximate midpoint 80 such as by using a pair of mating Velcro strips, for example.

FIG. 2 also illustrates that the distal ends 82 of the side panel flaps 70 may be releasably coupled with a corresponding portion of the side panels 52 such as by using a pair of mating Velcro strips 84, for example, with one mate attached to the underside of each side flap 70 and the other mate attached in a mating position on the exterior surface of each side panel 52. Alternate means for releasably coupling the flaps 70 to the panels 52 will be recognized by those skilled in the art such as by using snaps, hooks or buttons, for example. The proximate ends 86 of the side panel flaps 70 may be sewn along their proximate edges 87 to the corresponding edges of the side panels 52. In one exemplary embodiment, when the protective cover 12 is in its "closed" configuration as shown in FIG. 2, the lower edges 88 of the side panel flaps 70 are not connected with the respective side panels 52 except that a portion of the respective lower edges 88 may be releasably connected to the panels by the mating Velcro strips 84. The lower edge 90 of the back panel flap 72 is not connected to the back panel 54 except that a portion may be connected to the back panel 54 proximate the midpoint 80. It should be understood that Velcro strips 84 do not need to traverse the entire height of respective side panel flaps 70 nor does the connection at midpoint 80 need to traverse the entire height of the back panel flap 72.

Figure 3:
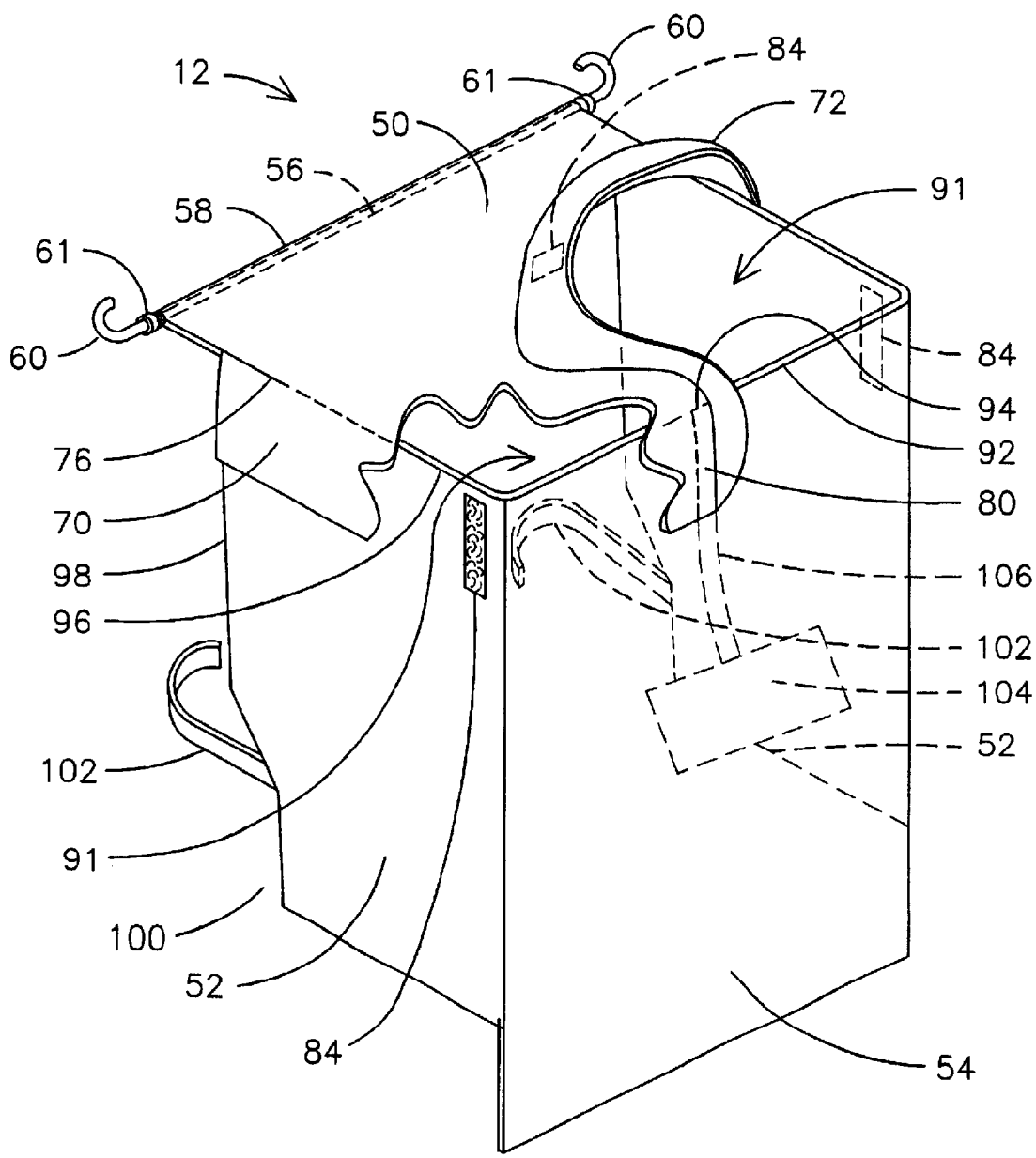
FIG. 3 illustrates the exemplary embodiment of FIG. 2 with a portion of a top panel broken away.

FIG. 3 illustrates a portion of the top panel 50 broken away and another portion folded back away from a respective side panel 52 and back panel 54. The protective cover 12 when attached to cart 10 and in its "open" position defines duel openings 91 or "convertible tops" for gaining access to golf clubs 34 or golf bags 36 that may be stowed in bag storage area 32 of cart 10. In this respect as shown in FIG. 3, an upper edge 92 of the back panel 54 may not be connected with the top panel 50 except at the upper end 94 of the seam connecting the top panel 50 to the back panel 54 at the midpoint 80 of the back panel flap 72. Similarly, a first segment of the respective upper edges 96 of side panels 52 may not be connected with the top panel 50 while a second segment of the respective upper edges 96 may be attached to the top panel 50. For example, the segment of upper edge 96 shown exposed and in phantom in FIG. 3 may not be attached to the top panel 50 so that when the mating Velcro strips 84 are unmated a portion of the top panel 50 may be folded upwardly and away from the side and back panels 52 and 54 to define one of the duel openings 91 for accessing the bag storage area 32. The second segments of respective upper edges 96 of each side panel 52 may be attached to the top panel 50 along a respective portion of the seam defined by the intersection of the top panel 50 and the respective upper edge 76 portion of the side flap 70. In one exemplary embodiment, the length of each upper edge 96 segment not attached to the top panel 50 may be between about 8 to 10 inches with one exemplary embodiment being about 9 inches. Alternate embodiments allow for the lengths of the first and second segments to vary as well as the length of the upper edge 92 not attached to the top panel 50 to allow for varying sizes of duel openings 91. Another alternate embodiment allows for the upper edge 92 to be releasably connected to the back panel 54 proximate midpoint 80 or not connected to the back panel 54 at any point. In this respect, one opening 91 may be defined when all or part of the rearward portion of the top panel 50 is lifted up and away from one or both side panels 52 and back panel 54, for example.

One aspect allows for the back panel 54 to be longer than the length of the side panels 52. It is advantageous to provide a longer back panel 54 to protect the lower extremities of the equipment stowed in the bag storage area 32 from water, mud and/or grass that may be thrown by the tires of cart 10 or through splashing. One embodiment allows for the back panel 54 to be substantially rectangular. In comparison, a forward edge 98 of the side panels 52 may have a gradual taper so that the bottom edge 100 is shorterer than a top edge 100 of the side panels. Means for releasably coupling each side panel 52 to cart 10, such as a nylon strap 102 having mating strips of Velcro appropriately attached thereto, may be affixed to each panels' forward edge 98. Each nylon strap 102 may be releasably coupled to a portion of the cart 10 such as by looping the straps 102 around a lower portion of the rear support posts 20, through the handrails 23 and/or through openings in a basket (not shown) situated behind seat back cushion 40. Alternate places for attachment may be identified by an end user of the protective cover 12 depending on the type of vehicle or structure to which the cover 12 is being attached.

Another aspect allows for a carry bag or pouch 104 shown in FIG. 3 to be attached to the inside of the protective cover 12 in a conventional manner such as by sewing one end of a nylon strap 106 to the pouch 104 and the other end of the strap 106 proximate the upper end 94 of the seam proximate the midpoint 80 of back panel flap 72, for example. Pouch 104 may be made of any suitable material such as a lightweight, mildew resistant, water repellant and/or resistant material such as a commercially available durable nylon. One aspect allows for the protective cover 12 to be folded and placed within the pouch 104 for storage. Pouch 106 may include a drawstring around its opening, and an associated cinch, for closing the pouch and keeping it closed. One aspect allows for cover 12 to be first folded inside out to form a substantially rectangular configuration by folding the side panels 52 and top panel 50 over the back panel 54. The cover 12 may then be folded horizontally in five approximately equal sections then formed into a tri-fold configuration for insertion into pouch 104.

It will be recognized by those skilled in the art that all seams between various pieces of the protective cover 12 may be sewn together in a conventional manner. It will also be recognized that fabricating the protective cover 12 may be accomplished in a variety of ways in addition to the manner described herein.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

We claim:

1. An apparatus that may be removably attached to a golf cart for covering a bag storage area of the golf cart, the apparatus comprising:
   a top panel having a pair of lateral edges and a rearward edge;
   means for releasably coupling the top panel to the golf cart;
   a first side panel and a second side panel extending downwardly from respective lateral edges of the top panel, the first and second side panels each having a respective upper edge wherein a first segment of each respective upper edge is connected to a respective one of the pair of lateral edges of the top panel;
   a back panel extending downwardly from the rearward edge of the top panel, the back panel having a rear upper edge and a pair of lateral edges wherein the back panel is connected along a portion of each lateral edge to a respective rearward edge of the first and second side panels and wherein a portion of the rear upper edge of the back panel is connected to the top panel;
   means for releasably coupling a portion of the top panel to at least one of the first side panel and the second side panel and the back panel such that a portion of the top panel may be lifted to define an opening in the apparatus for accessing the bag storage area of the golf cart when the apparatus is attached to the golf cart; and
   means for releasably coupling a portion of the first side panel and a portion of the second side panel to the golf cart.

2. The apparatus of claim 1 further comprising:
   a pair of side panel flaps extending from a respective portion of the lateral edges of the top panel wherein a respective one of the side panel flaps overhangs a respective one of the pair of side panels; and
   back panel flap extending from a respective portion of the rearward edge of the top panel and overhanging the back panel.

3. The apparatus of claim 2, the means for releasably coupling a portion of the top panel to at least one of the first side panel and the second side panel and the back panel comprising:
   a first pair of mating hook and loop strips wherein one strip is affixed on an underside of a first one of the pair of side panel flaps and the other strip is affixed in a mating relationship to a corresponding location on a respective first one of the side panels; and
   a second pair of mating hook and loop strips wherein one strip is affixed on an underside of a second one of the pair of side panel flaps and the other strip is affixed in a mating relationship to a corresponding location on a respective second one of the side panels.

4. The apparatus of claim 1, the means for releasably coupling the top panel to the golf cart comprising:
   a cord located in a channel formed in a forward edge of the top panel;
   a first hook affixed to a first end of the cord; and
   a second hook affixed to a second end of the cord.

5. The apparatus of claim 4, the means for releasably coupling a portion of the first side panel and a portion of the second side panel to the golf cart comprising:
   a first strap affixed to the first side panel, the first strap having mating portions of hook and loop affixed thereto so that the first strap may be looped around a portion of the golf cart; and
   a second strap affixed to the second side panel, the second strap having mating portions of hook and loop affixed thereto so that the second strap may be looped around a portion of the golf cart.

6. The apparatus of claim 2 wherein the rear upper edge of the back panel is connected to the top panel proximate a midpoint of the back panel.

7. The apparatus of claim 6, the means for releasably coupling a portion of the top panel to at least one of the first side panel and the second side panel and the back panel comprising:
   a first set of mating hook and loop strips wherein one strip is affixed on an underside of a first one of a pair of side panel flaps, each of the pair of side panel flaps extending from a respective one of the lateral edges of the top panel, and the other strip is affixed in a mating relationship to a corresponding location on a respective first one of the side panels; and a second set of mating hook and loop strips wherein one strip is affixed on an underside of a second one of the pair of side panel flaps and the other strip is affixed in a mating relationship to a corresponding location on a respective second one of the side panels.

8. The apparatus of claim 6, the means for releasably coupling a portion of the top panel comprising:

a first set of mating hook and loop strips wherein one strip is affixed to a first portion of the top panel and the other strip is affixed in a mating relationship to a corresponding location on the first side panel; and a second set of mating hook and loop strips wherein one strip is affixed to a second portion of the top panel and the other strip is affixed in a mating relationship to a corresponding location on the second side panel.

9. The apparatus of claim 1 wherein the back panel has a first length and each of the first side panel and the second side panel have a second length wherein the first length is greater than the second length.

10. The apparatus of claim 9 wherein at least one of the first side panel and the second side panel is tapered along a respective forward edge so that a bottom edge of the respective panel is narrower than a top edge of the respective panel.

11. The apparatus of claim 2, the means for releasably coupling the top panel to the golf cart comprising:

an elastic cord located in a channel formed in a forward edge of the top panel;

a first hook affixed to a first end of the cord; and a second hook affixed to a second end of the cord; and the means for releasably coupling a portion of the top panel to at least one of the first side panel and the second side panel and the back panel comprising:

a first set of mating hook and loon strips where one strip is affixed on an underside of a first one of a pair of side panel flaps extending from respective lateral edges of the top panel and the other strip is affixed in a mating relationship to a corresponding location on a respective first one of the side panels; and a second set of mating hook and loop strips where one strip is affixed on an underside of a second one of the pair of side panel flaps and the other strip is affixed in a mating relationship to a corresponding location on a respective second one of the side panels.

12. A protective cover for overlaying golf clubs stowed in a bag storage area of a golf cart, the protective cover comprising:

a top panel sized to substantially cover the bag storage area when the protective cover is attached to the golf cart;

an elastic cord fitted in a front edge of the top panel;

a first means for releasably connecting the top panel to the golf cart affixed to a first end of the elastic cord;

a second means for releasably connecting the top panel to the golf cart affixed to a second end of the elastic cord;

a curtain portion having an upper edge and extending downwardly from the top panel, the curtain portion being sized to substantially surround the bag storage area when the protective cover is attached to the golf cart; the curtain portion being attached along the upper edge to the top panel to define at least a first opening when a respective first portion of the top panel is lifted away from the curtain.

13. The protective cover of claim 12 wherein the curtain comprises a pair of side panels and a back panel configured with the top panel to form a substantially rectangular enclosure that substantially surrounds the bag storage area when the cover is attached to the golf cart wherein an upper edge of each of the side panels and a top portion of the back panel are connected with the top panel to define the first opening and a second opening where one of the openings is substantially above a first portion of the bag storage area and the other opening is substantially above a second portion of the bag storage area when respective portions of the top panel are lifted away from the pair of side panels and the back panel.

14. The protective cover of claim 13 wherein the back panel is connected to the top panel proximate a midpoint of an upper edge of the back panel and the respective upper edge of each side panel is connected to the top panel along a segment of each respective upper edge that is less than a total length of each respective upper edge of each side panel.

15. The protective cover of claim 13 further comprising:

means for releasably connecting a portion of the top panel to the curtain portion wherein the portion of the top panel can be separated from the curtain portion to define the at least the first opening.

16. The protective cover of claim 15 further comprising:

means for releasably coupling a forward edge of the curtain portion to the golf cart.

17. The protective cover of claim 13 wherein the back panel has a first length and each of the side panels has a second length wherein the first length is greater than the second length.

18. The protective cover of claim 12 wherein the top panel extends beyond a forward edge of the curtain portion when the protective cover is attached to the golf cart.

19. An apparatus that may be removably attached to a golf cart for covering a bag storage area of the golf cart, the apparatus comprising:

a top panel;

means for releasably coupling a forward edge of the top panel to the golf cart;

pair of side panels extending downwardly from the top panel, each side panel connected with the top panel along a first segment of a respective upper edge of each side panel;

means for releasably connecting a respective forward edge of each side panel to the golf cart;

a back panel extending downwardly from the top panel, the back panel disposed between the pair of side panels such that the top panel, side panels and back panel define a substantially rectangular enclosure that covers the bag storage area when the apparatus is attached to the golf cart;

a first set of mating hook and loop strips for releasably connecting a first corner portion of the top panel to a first one of the pair of side panels; and a second set of mating hook and loop strips for releasably connecting a second corner portion of the top panel to a second one of the pair of side panels and wherein an upper edge of the back panel is connected to the top panel proximate a midpoint of the top panel such that the first and second corner portions of the top panel may be released and lifted away from respective ones of the pair of side panels and the back panel to define a first opening and a second opening for accessing the bag storage area of the golf cart.

* * * * *